UNITED STATES PATENT OFFICE.

MYRTIL KAHN AND ANTON OSSENBECK, OF ELBERFELD, GERMANY, ASSIGNORS TO FARBENFABRIKEN VORM. FRIEDR. BAYER & CO., OF ELBERFELD, GERMANY, A CORPORATION OF GERMANY.

AZO DYE.

1,027,132.  Specification of Letters Patent.  Patented May 21, 1912.

No Drawing. Application filed January 4, 1912. Serial No. 669,425.

*To all whom it may concern:*

Be it known that we, MYRTIL KAHN and ANTON OSSENBECK, doctors of philosophy, chemists, citizens of the German Empire, residing at Elberfeld, Germany, have invented new and useful Improvements in Azo Dye, of which the following is a specification.

We have found that new azo dyestuffs are obtained by combining the diazo compounds of ortho-aminophenol sulfonic acids with meta-aminobenzidin (2. 4. 4'-triaminodiphenyl). The coloring matters thus obtained which have probably the following formula:

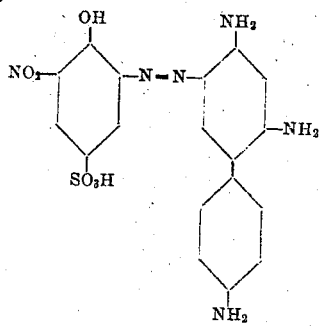

are after being dried and pulverized brown powders soluble in concentrated sulfuric acid generally with a red coloration; yielding upon reduction with stannous chlorid and hydrochloric acid an ortho-aminophenol sulfonic acid and 2.4-5.4'-tetra-aminodiphenyl. They dye wool in brown shades which after being chromed are distinguished by their excellent fastness to potting.

In order to illustrate the new process more fully the following example is given, the parts being by weight:—The diazo compound obtained from 23.4 parts of 6-nitro-2-aminophenol-4-sulfonic acid is added to a solution of 19.9 parts of aminobenzidin dissolved in the necessary quantity of hydrochloric acid. The mixture is gently heated to form 30–40° C. rendered slightly alkaline by gradual addition of sodium carbonate and the dye is then salted out, pressed and dried. It is after being dried and pulverized a brown powder soluble in concentrated sulfuric acid with a red coloration; yielding upon reduction with stannous chlorid and hydrochloric acid 2.6-diamino-1-phenol-4-sulfonic acid and 2.4.5.4'-tetraaminodiphenyl. The shade produced with it is after being chromed a dark brown fast to potting. Other orthoaminophenolsulfonic acids *e. g.* 2-aminophenol-4-sulfonic acid, 4-chloro-2-aminophenol-6-sulfonic acid can be used.

We claim:—

1. The herein described new azo dyestuffs which are after being dried and pulverized brown powders soluble in concentrated sulfuric acid generally with a red coloration; yielding upon reduction with stannous chlorid and hydrochloric acid an ortho-aminophenol sulfonic acid and 2.4-5.4'-tetraaminodiphenyl; dyeing wool in brown shades which after being chromed are distinguished by their excellent fastness to potting, substantially as described.

2. The herein described new azo dyestuff which is after being dried and pulverized a brown powder soluble in concentrated sulfuric acid with a red coloration; yielding upon reduction with stannous chlorid and hydrochloric acid 2.6-diamino-1-phenol-4-sulfonic acid and 2.4.5.4'-tetraaminodiphenyl; dyeing wool in brown shades which are after being chromed distinguished by their excellent fastness to potting, substantially as described.

In testimony whereof we have hereunto set our hands in the presence of two subscribing witnesses.

MYRTIL KAHN. [L. S.]
ANTON OSSENBECK. [L. S.]

Witnesses:
CHARLOTTE KNAPP,
HELEN NUFER.